United States Patent
Klassen et al.

(10) Patent No.: US 7,511,860 B2
(45) Date of Patent: Mar. 31, 2009

(54) SYSTEMS AND METHODS OF EMBEDDING GAMUT MAPPING INFORMATION INTO PRINTED IMAGES

(75) Inventors: R. Victor Klassen, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 794 days.

(21) Appl. No.: 10/988,555

(22) Filed: Nov. 16, 2004

(65) Prior Publication Data
US 2006/0103861 A1 May 18, 2006

(51) Int. Cl.
H04N 1/40 (2006.01)
(52) U.S. Cl. .................. 358/3.28; 358/1.9; 382/162
(58) Field of Classification Search .......... 382/162, 382/167; 358/1.9; 380/200
See application file for complete search history.

(56) References Cited

U.S. PATENT DOCUMENTS

| 6,282,311 B1 * | 8/2001 | McCarthy et al. ........... 382/162 |
| 6,282,312 B1 | 8/2001 | McCarthy et al. |
| 6,282,313 B1 | 8/2001 | McCarthy et al. |
| 6,603,879 B2 * | 8/2003 | Haikin et al. ............ 382/167 |
| 6,748,106 B1 * | 6/2004 | Bryant et al. ............ 358/1.9 |
| 6,754,384 B1 * | 6/2004 | Spaulding et al. ......... 382/167 |
| 6,850,342 B2 * | 2/2005 | Woolfe et al. ............ 358/1.9 |
| 7,024,055 B2 * | 4/2006 | Newman ................ 382/162 |
| 7,064,861 B2 * | 6/2006 | Wexler et al. ............ 358/1.9 |
| 2004/0146159 A1 * | 7/2004 | Rosen .................. 380/200 |
| 2005/0185200 A1 * | 8/2005 | Tobol ................... 358/1.9 |

* cited by examiner

*Primary Examiner*—Twyler L Haskins
*Assistant Examiner*—Nicholas C Pachol
(74) *Attorney, Agent, or Firm*—Oliff & Berridge, PLC

(57) ABSTRACT

Systems and methods preserve the information lost in gamut-mapping during marking (e.g., printing) such that the lost information survives the marking and recapture (e.g. scanning) process. Generally, an encoding method may include gamut-mapping and image for a particular device; determining a residual image; and embedding the information needed to recover the residual image within the pixels of the gamut-mapped image. Generally, a decoding method may include extracting the embedded information from the image; and using the residual image to restore the gamut-mapped image to the original image.

17 Claims, 4 Drawing Sheets

SYSTEMS AND METHODS OF EMBEDDING GAMUT MAPPING INFORMATION INTO PRINTED IMAGES

BACKGROUND OF THE INVENTION

1. Field of Invention

This invention generally relates to image processing.

2. Description of Related Art

Devices that create, capture and/or reproduce color images have a color gamut ("gamut") associated with them. A gamut is the range of colors that the device is capable of capturing or reproducing. When, for example, a color image created or captured by an originating device with an associated gamut, (e.g., a graphics program, a digital camera, or a scanner) is input into another device (e.g., a printer) to be reproduced, the originating device's gamut must be mapped onto the reproducing device's gamut.

Not all devices have equally large gamuts. An image captured by, or created for, one device may contain colors not reproducible on some other device. The input image in such a case contains "out-of-gamut" colors. Because something must be output for every input image pixel, a substitute color is chosen for each color that is "out-of-gamut." In other words, any colors that are capable of being captured or created by the originating device (inside that device's gamut), but incapable of being reproduced by the reproducing device (outside that device's gamut) must be mapped, or adjusted, to colors that are within the reproducing device's gamut. Unless the originating device's gamut is quite small, some colors must be changed to produce an image that is entirely within the reproducing device's gamut, e.g., the printer's gamut.

Thus, when a color image captured or created on one device is reproduced by another device, some information is invariably lost due to gamut mapping. If that reproduced image is subsequently captured by a third device (e.g., scanned) the lost color information due to the initial gamut mapping is not recoverable. Furthermore, if the captured reproduced image is reproduced on, for example, a printer with a larger gamut, or if the captured print-ready file is re-purposed for a larger-gamut printer, the larger-gamut printer will only reproduce the captured image with colors adjusted for the smaller gamut of the original reproduction device. This is because most gamut mapping algorithms are not invertible, and hence even an attempt to re-map the image by inverting the gamut mapping prior to re-mapping for printing on the new device will fail.

Prior techniques for encoding information lost in gamut-mapping work only for electronic images, and will not survive printing and scanning. For example, U.S. Pat. Nos. 6,282,311, 6,282,312, and 6,282,313 teach a method for retaining information that is lost when representing digital camera images in a smaller gamut, such as sRGB encoding. A digital camera captures scenes whose gamut is typically much larger than that of sRGB. A standard gamut mapping of the camera signals to sRGB can thus irreversibly distort colors outside the sRGB gamut. U.S. Pat. Nos. 6,282,311, 6,282, 312, and 6,282,313 propose computing a residual image between the original and gamut-mapped image, compressing the residual image, and storing the compressed residual image as metadata within the gamut-mapped electronic image. Because the residual image is stored electronically, this residual image is unavailable once the gamut-mapped electronic image has been printed.

SUMMARY OF THE INVENTION

Gamut mapping algorithms tend not to be invertible for at least two reasons. First, they are typically non-linear, and normally operate in an 8-bit input and 8-bit output space. For this reason, multiple large-gamut colors will map to the same small-gamut color, due to quantization effects. For example, "L* compression" rescales the lightness axis, possibly in a non-linear fashion, so that all input lightness values fit within reproducible values.

Second, gamut mapping algorithms often employ some amount of clipping. Clipping maps many of the large-gamut input colors outside the small-gamut boundary to the same small-gamut color on or near the small-gamut gamut boundary. For example, "hard clipping" maps large-gamut colors that are beyond the small-gamut boundary to small-gamut boundary colors. "Soft clipping" provides a smooth transition, mapping some in-gamut colors to colors further within the gamut and out-of-gamut colors to the boundary or further in.

Therefore, even if the gamut mapping algorithm is known, the inverse of that algorithm cannot be used to restore a reproduced gamut-mapped image to its original full gamut condition, in preparation for display or printing on a device with a different gamut. This is because each gamut-mapped color value, especially those near the gamut boundary, could have been any number of out-of-gamut colors prior to the mapping. Furthermore, without a digital key (e.g., an electronic record of the pre-mapped color values, such as that proposed by U.S. Pat. Nos. 6,282,311, 6,282,312, and 6,282, 313), there is no way to determine which of those out-of-gamut colors should be used. As discussed above, because the electronic record is lost once the gamut-mapped image is printed, there is no way to reverse that gamut-mapping if the printed image is subsequently recaptured to be output on a larger gamut device.

Accordingly, various exemplary implementations described herein preserve a residual image, i.e., the data that is lost during gamut mapping, physically within the gamut-mapped image. Therefore, even if the gamut-reduced image is printed and subsequently recaptured, the residual image may be extracted from the recaptured image and used to reconstruct the original pre-gamut-mapped image.

An original image and a corresponding gamut-mapped image may be compared. The difference between these two images, or residual image, contains that portion of the original image that was out-of-gamut, or unable to be produced by the device for which the image is being mapped. The residual image may then be encoded into the gamut-mapped image in such a manner that it will survive printing and subsequent scanning.

To recover the original image from a marked (e.g., printed) copy of the corresponding gamut-mapped image, the marked image may be captured (e.g., scanned). The encoded information may be recovered and added back to the captured image. Thus, even though the gamut-mapped image was printed, it is possible to subsequently reproduce the original image using a device with a larger gamut than the gamut-mapped image.

BRIEF DESCRIPTION OF THE DRAWINGS

Various examples are discussed with reference to the accompanying drawings, wherein.

DISCUSSION OF EXEMPLARY SYSTEMS AND METHODS

Various exemplary techniques presented herein preserve the information lost in gamut-mapping during marking (e.g., printing) such that the lost information survives the marking and recapture (e.g. scanning) process. As discussed above, there are two basic components: encoding, and decoding. Generally, an encoding method may include:

1) gamut-mapping an image for a particular device;
2) comparing the gamut mapped image with the original, to obtain a residual image; and
3) embedding the information needed to recover the residual image within the pixels of the gamut-mapped image.

A decoding method may essentially invert the encoding method and generally may include:

5) extracting the embedded information from the image; and
7) adding the residual image to the gamut-mapped image to restore the original image.

Digital watermarking or steganography provides many algorithms for embedding extra information in an image. U.S. Patent Application [Xerox Invention Disclosure A/22198] describes a method for producing an invisible watermark that survives the process of printing and scanning. According to this method, information is embedded in an image in the choice of the halftone dot selected from a conjugate pair. This method can support hidden information at an information density of at least 100-150 dpi (that is, 10,000-22,500 bits per square inch). [Xerox Invention Disclosure A/22198] is incorporated herein in its entirety.

Thus, the residual image may be embedded in the gamut-mapped image using such a digital watermark. An exemplary method of encoding a residual image within a gamut-mapped image using a digital watermark is described below with reference to FIG. 1.

Figure 1:
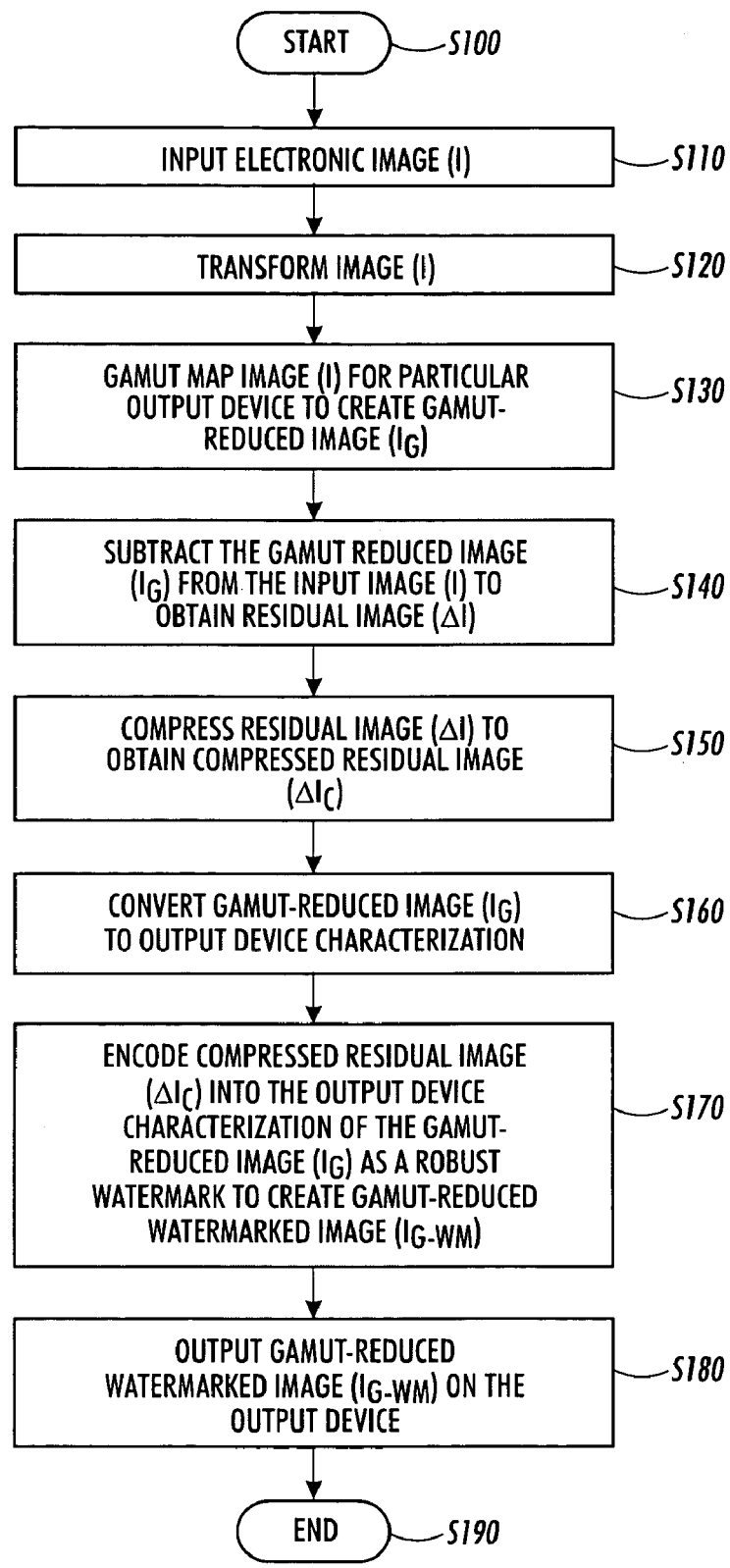
FIG. 1 shows an exemplary method for encoding a residual image within a gamut-mapped image.

As shown in FIG. 1, operation of the method begins in step S100. Operation continues to step S100, where an electronic image I is input. For the purpose of this example, it is assumed that the input image I was captured by, or created for, a device with a relatively large gamut. Next, in step S120, the electronic image I is transformed. This transform step may comprise, for example, the application of a lightness (L*) compression function, which is frequently employed as a preprocessing step in gamut-mapping. Many pre-processing transform steps are substantially reversible. Thus, any desired transform functions may be performed prior to gamut mapping. However, one or more image transform functions (especially those that are not substantially reversible) may be included as part of the gamut-mapping. The various transform functions (especially those that are not substantially reversible) may be encoded into the image separately. Operation continues to step S130.

In step S130, the transformed image I is gamut-mapped for the particular output device to create a gamut-reduced image $I_G$. For the purpose of this example, it is assumed that the output device has a gamut that is smaller than the gamut of the original image. Then, in step S140, the original transformed image I is compared with the gamut-reduced image $I_G$ to obtain a residual image $\Delta I$. As discussed above, the residual image is the difference between the gamut-reduced image $I_G$ and the original transformed image, and may be generally determined according to the following equation:

$$I - I_G = \Delta I \qquad (1)$$

It should be appreciated that, if one or more image transforms are part of the gamut-mapping, the gamut mapped image may be compared to the original image I rather than the transformed image I to obtain the residual image $\Delta I$. Operation continues to step S150.

In step S150, the residual image $\Delta I$ may be compressed to obtain a compressed residual image $\Delta I_C$. Compressing the residual image $\Delta I$ reduces the amount of data that must be encoded into the gamut-reduced image $I_G$. Because the amount of data that can be encoded into an image using a digital watermark may be limited by the size of the image, it may be desirable to reduce the amount of data to be encoded. The residual image $\Delta I$ may be compressed by any known or later-developed compression method, including both lossless and lossy methods. Specifically, the residual image $\Delta I$ may be compressed by, for example, one or more of JPEG, JPEG 2000, or predictive coding. The residual image may also remain partially or wholly uncompressed. Operation continues to step S160.

In step S160, the gamut-reduced image $I_G$, for example, may be converted to the output device's color space characterization. For instance, known creation and capture devices usually characterize images in, for example, L*a*b*, CIELAB, RGB, sRGB, XYZ, HIS and/or HSV color space. Known output devices, such as color printers, usually characterize images in CMY and/or CMYK color space. Common broadcast color space characterizations include YIQ and YUV. Thus, if the gamut-reduced image $I_G$ is characterized by a color space other than that of the output device, the gamut-reduced image $I_G$ will need to be converted to the color space of the output device. Operation continues to step S170.

In step S170, the compressed residual image $\Delta I_C$ may be encoded into the output device characterization of the gamut-reduced image $I_G$, for example, as a digital watermark to create a gamut-reduced watermarked image $I_{G-WM}$. Thus, the gamut-reduced watermarked image $I_{G-WM}$, although mapped to a smaller gamut, contains the information necessary (i.e., the digital watermark) to restore the image to its original gamut. Accordingly, even if only a hardcopy of the printed gamut-reduced watermarked image $I_{G-WM}$ is available, the image may be captured (e.g., scanned) and restored to its original gamut, for example, for output by a larger gamut printer.

In step S180, the gamut-reduced watermarked image $I_{G-WM}$ may be output on an output device. Finally, in step S190, operation of the exemplary method ends.

Figure 2:
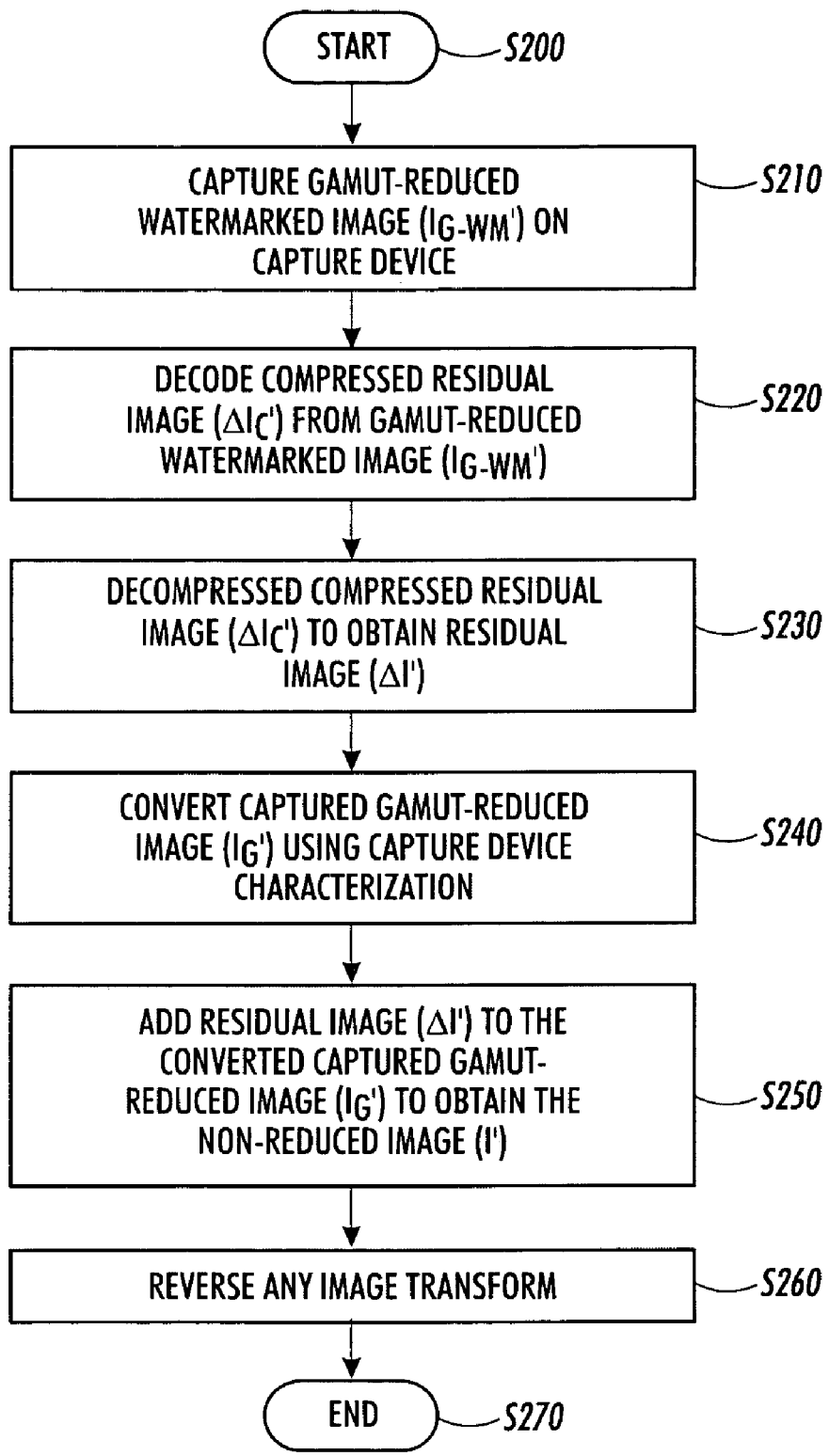
FIG. 2 shows an exemplary method for decoding a residual image within a gamut-mapped image.

A captured gamut-reduced watermarked image may be restored to its original gamut by, for example, the method shown in FIG. 2. FIG. 2 shows an exemplary method of decoding a residual image within a gamut-mapped image. As shown in FIG. 2, operation of the method begins in step S200. Then, in step S210, a gamut-reduced watermarked image $I_{G-WM}'$ is captured by a capture device. The capture device may be, for example, a scanner, a color photocopier, a color facsimile machine, and/or a color digital camera. For the purpose of this example, and for ease of explanation, it is assumed that the capture device is a scanner. Operation continues to step S220.

In step S220, a compressed residual image $\Delta I_C'$ may be decoded from the gamut-reduced watermarked image $I_{G-WM}'$. This may be done, for example, by evaluating the captured image data representing the gamut-reduced watermarked image $I_{G-WM}'$ and extracting the data encoded within the gamut-reduced watermarked image $I_{G-WM}'$. For example, as discussed above, according to U.S. patent application [Xerox Invention Disclosure A/22198], data may be encoded in an image by the deliberate choice of halftone dots selected from a conjugate pair. Thus, one method of decoding the compressed residual image $\Delta I_C'$ may include evaluating the various halftone dot selections within the gamut-reduced watermarked image $I_{G-WM}'$ and converting the deliberate halftone dot selections into a digital equivalent, i.e., the compressed residual image $\Delta I_C'$. Operation continues to step S230.

In step S230, the compressed residual image $\Delta I_C'$ is decompressed to obtain a full residual image $\Delta I'$. As discussed above with respect to the exemplary method of encoding a residual image within a gamut-mapped image using a digital watermark, the residual image $\Delta I'$ may not be encoded. If the residual image $\Delta I'$ is not encoded, step S230 is unnecessary. Operation continues to step S240.

In step S240, the captured gamut-reduced image $I_G'$, i.e., the captured image without consideration of the encoded watermark, may be converted to a device independent color space using, for example, the capture device characterization. Then, in step S250, the residual image $\Delta I'$ may be added to the converted captured gamut-reduced image $I_G'$ to obtain an original non-reduced image $I'$. The residual image $\Delta I'$ may be added to the converted captured gamut-reduced image $I_G'$ to obtain the original non-reduced image $I'$ because, as discussed above, the residual image $\Delta I'$ is, for example, the difference between the original image $I'$ and the gamut-reduced image $I_G'$. Accordingly, the original image may be generally determined according to the following exemplary equation:

$$I_G' + \Delta I' = I' \qquad (2)$$

Operation continues to step S260.

In step S260, any image transform that was not separately encoded into the gamut-reduced image or combined with the gamut-mapping function, may be substantially reversed according to known transform reversals or reversal approximations. Accordingly, the original image may be restored from a captured gamut-reduced watermarked image $I_{G-WM}'$, even if a hard copy of the gamut-reduced watermarked image $I_{G-WM}'$ is all that is available. Then, operation continues to step S270, where operation of the exemplary method ends.

As discussed above, with respect to each of the exemplary encoding and decoding methods, it is possible to separately encode a transfer function within the gamut-reduced image. If a transfer function is separately encoded within the gamut reduced image, the additional steps of encoding/decoding the transfer function would be necessary. Accordingly, two component residual images may be encoded within the gamut-reduced image. One of the component residual images $\Delta I_1$ may be determined as the difference between the original image I and the transformed image. The other component residual image $\Delta I_2$ may be determined as the difference between the transformed image and the gamut reduced image $I_G$. Such a relationship may be generally determined according to the following exemplary equation:

$$I = I_G + \Delta I_1 + \Delta I_2 \qquad (3)$$

Component residual images may be useful to preserve a record of each image transform and/or gamut mapping function separately. Thus, a history of the various transforms and/or gamut mapping functions may be obtained and, for example, less than all of the image transforms and/or gamut mapping functions, may be reversed, if desired.

Accordingly, it should be appreciated that, depending on the amount of data that may be encoded into a gamut-reduced image, any number of component residual images may be encoded into the gamut-reduced image. Each component image may require a separate encoding/decoding step. Furthermore, in order to reduce the amount of data encoded into the gamut-reduced image any number of image transforms and/or gamut-mapping functions may be cumulatively applied and a single residual image determined as the difference between the original image and the resulting image after the plurality of image transforms and/or gamut-mapping functions has been applied.

Figure 3:
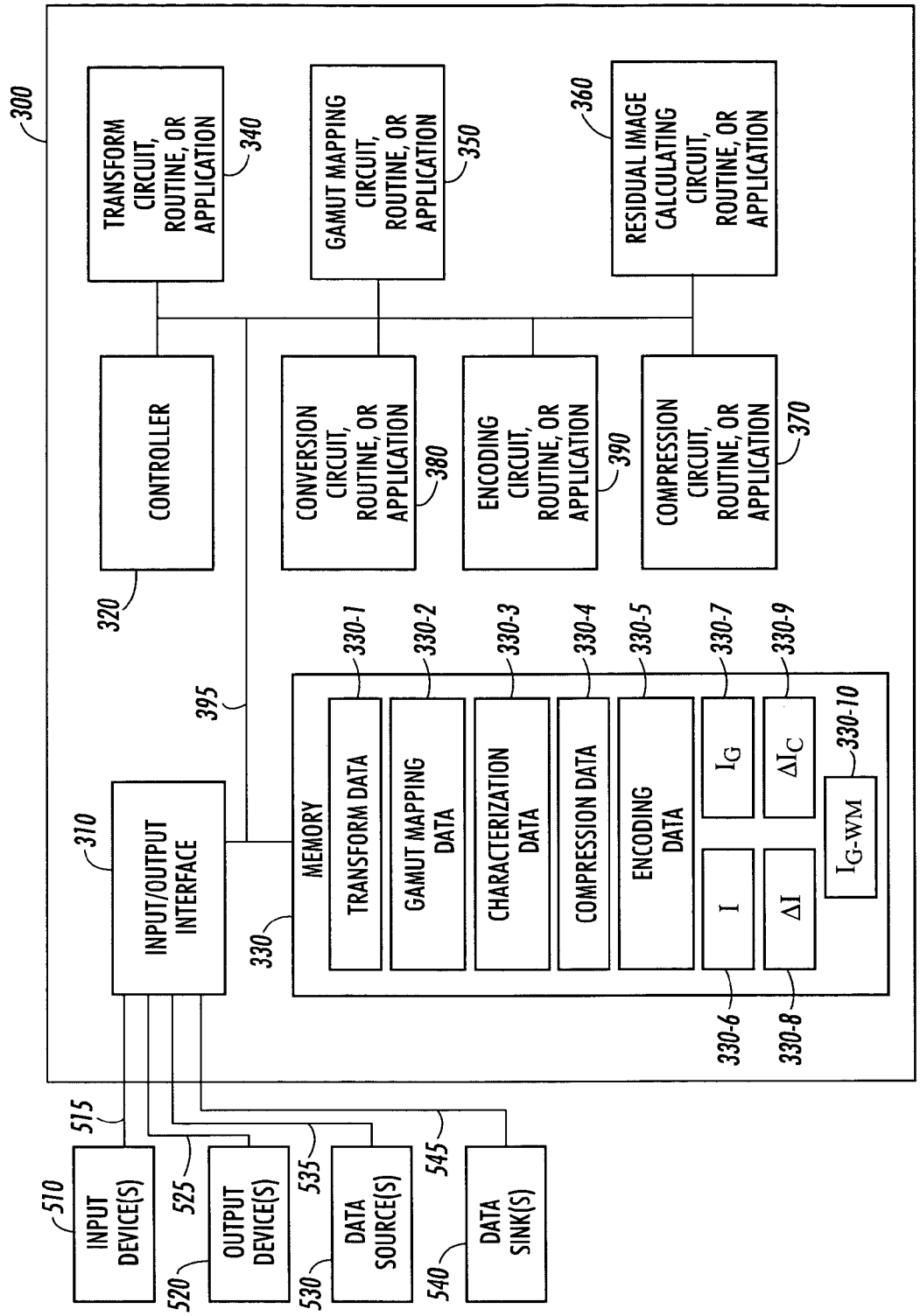
FIG. 3 shows a functional block diagram of an exemplary system for encoding a residual image within a gamut-mapped image.

Any of the above described exemplary methods may be implemented by one or more of a system for encoding a residual image within a gamut-mapped image, a system for decoding a residual image within a gamut-mapped image, and/or a system for encoding and decoding a residual image within a gamut-mapped image. FIG. 3 shows a functional block diagram of an exemplary system 300 for encoding a residual image within a gamut-mapped image according to the invention.

As shown in FIG. 3, the system 300 may be functionally, physically, or conceptually divided into an input/output interface 310, a controller 320, a memory 330, a transform circuit, routine, or application 340, a gamut mapping circuit, routine, or application 350, a residual image calculating circuit, routine, or application 360, a compression circuit, routine, or application 370, a conversion circuit, routine, or application 380, and/or an encoding circuit, routine, or application 390, each appropriately interconnected by, for example, one or more data/control busses and/or application programming interfaces 395.

As shown in FIG. 3, the input/output interface 310 may be connected to one or more input devices 510 over one or more links 515. The input device(s) may be one or more of a keyboard, a mouse, a track ball, a track pad, a touch screen, a virtual reality glove, or any other known or later-developed device for inputting data and/or control signals to the system 300. The input/output interface 310 may be connected to one or more output devices 520 over one or more links 525. The output device(s) 520 may be one or more of a computer monitor, cathode ray tube, liquid crystal display, image projector, electrophoretic display, a virtual reality display device, an audio output device, or any other known or later-developed device for communicating information to a user of the system 300.

The input/output interface 310 may be connected to one or more data sources 530 over one or more links 535. The data source(s) may be a scanner, a digital camera, a color photocopier, a facsimile machine, a digital sender, a commercial digital photo processing kiosk, a portable memory/media reader, a locally or remotely controlled laptop or personal computer, a personal digital assistant, a tablet computer, a device that stores and/or transmits electronic image data, such as a client or server of a wired or wireless network, such as, for example, an intranet, and extranet, a local area network, a wide area network, a storage area network, and/or the Internet (especially the World Wide Web). In general the data source (s) 530 can be any known or later-developed source that is capable of providing electronic image data to the input/output interface 310. For example, the input/output interface 310 may be considered all or part of the data source(s) 530 since it may provide electronic data to the system 300.

The input/output interface 310 may be connected to one or more data sinks 540 over one or more links 545. The data sink(s) may be an inkjet printer, a laser printer, a facsimile machine, a color photocopier, a color xerographic device, any other type of printer, a commercial digital photo processing kiosk, a portable memory/media writer, a locally or remotely controlled laptop or personal computer, a personal digital assistant, a tablet computer, a device that stores and/or transmits electronic image data, such as a client or server of a wired or wireless network, such as, for example, an intranet, and extranet, a local area network, a wide area network, a storage area network, and/or the Internet (especially the World Wide Web). In general the data sink(s) 540 can be any known or later-developed sink that is capable of storing, transmitting, or outputting electronic image data. For example, the input/output interface 310 may be considered all or part of the data sink(s) 540 since it may store, transmit, or output electronic data from the system 300.

Each of the various links 515, 525, 535, and 545 may be any known or later-developed device or system for connecting the input device(s) 510, the output device(s) 520, the data source (s) 530, and/or the data sink(s) 540, respectively, to the input/output interface 310. In particular, the links 515, 525, 535, and 545 may each be implemented as, for example, one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 3, the memory 330 may be functionally, physically, or conceptually divided into a number of different memory portions, including a transform data portion 330-1, a gamut mapping data portion 330-2, a characterization data portion 330-3, a compression data portion 330-4, an encoding data portion 330-5, an image (I) portion 330-6, a gamut-mapped image ($I_G$) portion 330-7, a residual image ($\Delta I$) portion 330-8, a compressed residual image ($\Delta I_C$) portion 330-9, and/or a gamut-reduced watermarked image ($I_{G\text{-}WM}$) portion 330-10.

The transform data portion 330-1 may store data for image transforms (e.g., transform functions and/or algorithms). The gamut mapping data portion 330-2 may store data for gamut mapping (e.g., gamut-mapping functions and/or algorithms). The characterization data portion 330-3 may store data for converting between different color space characterizations (e.g., IIC profiles). The compression data portion 330-4, may store data for compressing an image (e.g., JPEG, JPEG 2000, or predictive coding transforms and/or algorithms). The encoding data portion 330-5 may store data for encoding data within an image (e.g., functions and/or algorithms necessary to create a digital watermark). The image (I) portion 330-6 may store an original image, for example, received from the data source(s) 530 or transformed by the transform circuit, routine, or application 430.

The gamut-mapped image ($I_G$) portion 330-7 may store an image that has been gamut mapped, for example, by the gamut mapping function, routine, or application 350. The residual image ($\Delta I$) portion 330-8 may store a residual image, for example, calculated by the residual image calculating circuit, routine, or application 360. The compressed residual image ($\Delta I_C$) portion 330-9 may store a compressed residual image, for example, compressed by the compression circuit, routine, or application 370. The gamut-reduced watermarked image ($I_{G\text{-}WM}$) portion 330-10 may store a gamut-reduced watermarked image.

The memory 330 shown in FIG. 3 may be implemented using any appropriate combination of alterable, volatile, non-volatile, non-alterable, and/or fixed memory. The alterable memory, whether volatile or non-volatile, can be implemented using, for example, any one or more of static or dynamic RAM, a floppy disk and disk drive, a writeable or re-re-writeable optical disk and disk drive, a hard drive, and/or flash memory. Similarly, non-alterable or fixed memory can be implemented using, for example, any one or more of ROM, PROM, EPROM, EEPROM, an optical ROM disk, such as CD-ROM or DVD-ROM disk, and/or disk drive.

The transform circuit, routine, or application 340 transforms image data. The gamut mapping circuit, routine, or application 350 maps image data with an associated gamut to another gamut. The residual image calculating circuit, routine, or application 360, when given two images, determines a residual image that is the difference between the two images. The compression circuit, routine, or application 370 compresses image data. The conversion circuit, routine, or application 380 converts image data with one color space characterization to another color space characterization. The encoding circuit, routine, or application 390 encodes data within an image to be output.

In operation, the exemplary system 300 for encoding a residual image within a gamut-mapped image may operate in the following manner.

Under control of the controller 320, data representing an image may be input, for example, from a data source 530 across link 535 via the input/output interface and may be stored in the original image(I) portion 330-6. Alternatively, the image data may be input, under control of the controller 320, directly into the transform circuit, routine, or application 340. Next, the transform circuit, routine, or application 340 may access the image data and/or transform data stored, for example, in the transform data portion 330-1 and transform the image data to create transformed image data. Under control of the controller 320, the transformed image data may be stored in the original image (I) portion 330-6 or, under control of the controller 320, input directly into the gamut mapping circuit, routine, or application 350.

It should be appreciated that if no image transform is necessary or desirable, the original image data may be input, under control of the controller 320, directly from a data source 530 into the gamut mapping circuit, routine, or application 350. The gamut mapping circuit, routine, or application 350 may access the original image data (either transformed or untransformed) and the gamut mapping data stored, for example, in the gamut mapping data portion 330-2, and may map the original image data to a predetermined gamut to create gamut-mapped image data. Then, under control of the controller 320, the gamut-mapped image data may be stored in the gamut-mapped image ($I_G$) portion 330-7. Alternatively, under control of the controller 320, the gamut-mapped image data may be input directly into the residual image calculating circuit, routine, or application 360.

The residual image calculating circuit, routine, or application 360 may access the gamut-mapped image data and the original image data may calculate a residual image data representing the residual image, or difference, between the gamut-mapped image data and the original image data. If the original image data was transformed prior to being gamut mapped, the transformed original image may be used to determine the residual image data. Next, under control of the controller 320, the residual image data may be stored in the residual image (ΔI) portion 330-8. Alternatively, under control of the controller 320, the residual image data may be input directly into the compression circuit, routine, or application 370.

The compression circuit, routine, or application 370 may access the residual image data and/or the compression data stored, for example, in the compression data portion 330-4 and compress the residual image data. Under control of the controller 320, the compressed residual image data may be stored in, for example, the compressed residual image ($\Delta I_C$) portion 330-9. Alternatively, under control of the controller 320, the compressed residual image data may be input directly into the encoding circuit, routine, or application 390.

The conversion circuit, routine, or application 380 may access the original image data stored, for example in the original image (I) portion 330-6 and the characterization data stored, for example, in the characterization data portion and convert the original image to an output device characterization. The output device may be the data sink 540 and thus its characterization may be known. Alternatively, the output device may be unknown and a generic output characterization may be used. Under control of the controller 320, the output device characterization of the original image (I) may be stored in the original image (I) portion 330-6. Alternatively, under control of the controller 320, the output device characterization of the original image may be input directly into the encoding circuit, routine, or application 590.

It should be appreciated that at least the gamut mapping data and/or characterization data may be stored ahead of time in the respective gamut mapping data portion 330-2 and characterization data portion 330-3. Alternatively, the gamut mapping data and/or the characterization data may be input and/or accessed directly from a data sink 350 for which the gamut-reduced watermarked image is being created.

The encoding circuit, routine, or application 590 may access the output device characterization of the original image, the compressed residual image data stored in, for example, the compressed residual image ($\Delta I_C$) portion 330-9, and/or the encoding data stored in, for example, the encoding data portion 330-5, and encode the compressed residual image data within the output device characterization of the original image as, for example, a digital watermark to create gamut-reduced watermarked image data. Then, under control of the controller 320, the gamut-reduced watermarked image data may be stored in the gamut-reduced watermarked image data ($I_{G-WM}$) portion 330-10. Alternatively, under control of the controller 320, the gamut-reduced watermarked image data may be directly output to a data sink 540 via the input/output interface 310.

Figure 4:
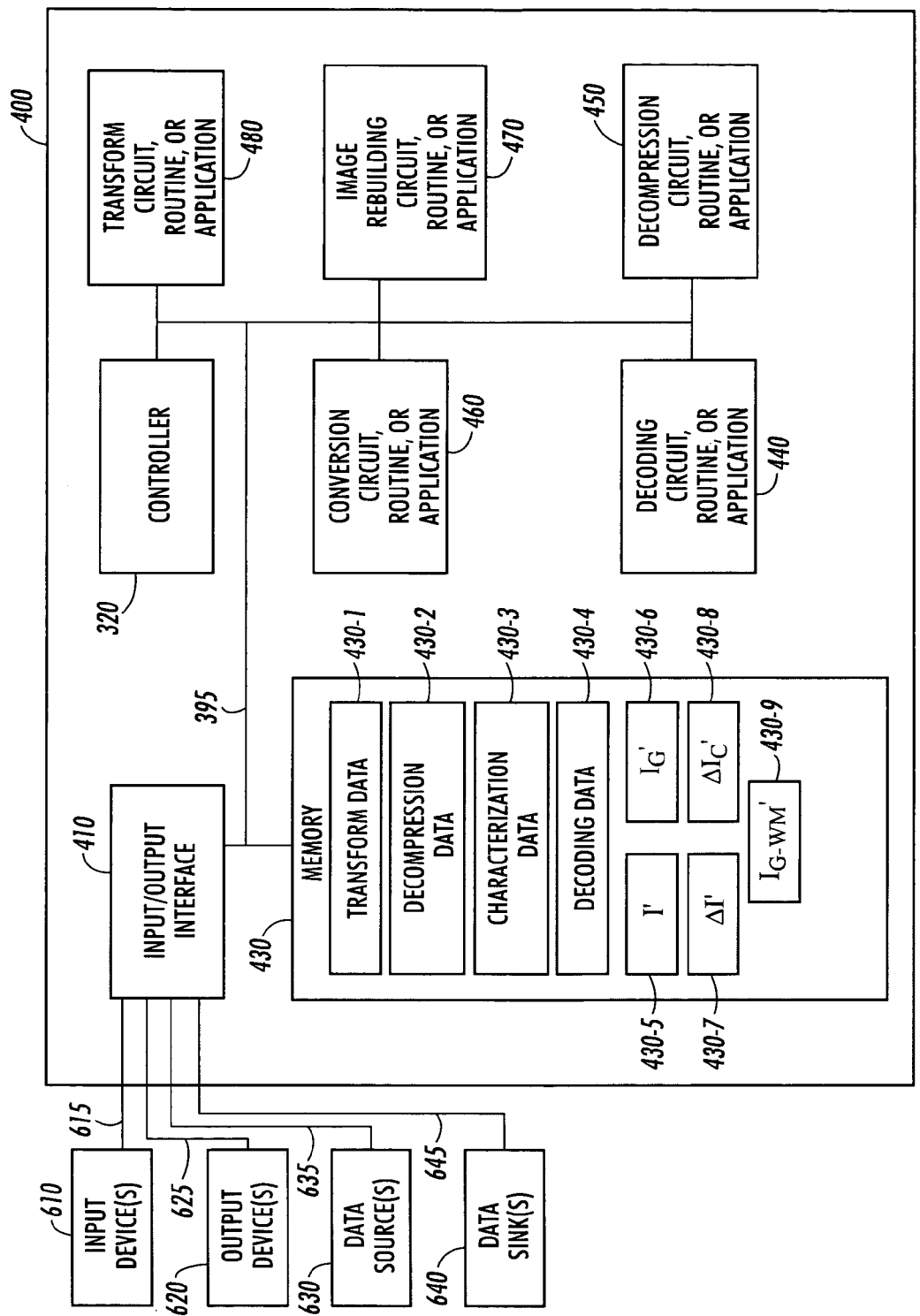
FIG. 4 shows a functional block diagram of an exemplary system for decoding a residual image within a gamut-mapped image.

FIG. 4 shows a functional block diagram of an exemplary system 400 for decoding a residual image within a gamut-mapped image according to the invention. As shown in FIG. 3, the system 400 may be functionally, physically, or conceptually divided into an input/output interface 410, a controller 420, a memory 430, a decoding circuit, routine, or application 440, a decompression circuit, routine, or application 450, a conversion circuit, routine, or application 460, an image rebuilding circuit, routine, or application 470 and/or a transform circuit, routine, or application 480, each appropriately interconnected by, for example, one or more data/control busses and/or application programming interfaces 490.

The input/output interface 410 may be connected to one or more input devices 610 over one or more links 615. The input device(s) may be one or more of a keyboard, a mouse, a track ball, a track pad, a touch screen, a virtual reality glove, or any other known or later-developed device for inputting data and/or control signals to the system 400. The input/output interface 410 may be connected to one or more output devices 620 over one or more links 625. The output device(s) 620 may be one or more of a computer monitor, cathode ray tube, liquid crystal display, image projector, electrophoretic display, a virtual reality display device, an audio output device, or any other known or later-developed device for communicating information to a user of the system 400.

The input/output interface 410 may be connected to one or more data sources 630 over one or more links 635. The data source(s) 635 may be a scanner, a digital camera, a color photocopier, a facsimile machine, a digital sender, a commercial digital photo processing kiosk, a portable memory/media reader, a locally or remotely controlled laptop or personal computer, a personal digital assistant, a tablet computer, a device that stores and/or transmits electronic image data, such as a client or server of a wired or wireless network, such as, for example, an intranet, and extranet, a local area network, a wide area network, a storage area network, and/or the Internet (especially the World Wide Web). In general the data source (s) 630 may be any known or later-developed source that is capable of providing electronic image data to the input/output interface 410. For example, the input/output interface 410 may be considered all or part of the data source(s) 630 since it may provide electronic data to the system 400.

The input/output interface 410 may be connected to one or more data sinks 640 over one or more links 645. The data sink(s) may be an inkjet printer, a laser printer, a facsimile machine, a color photocopier, a color xerographic device, any other type of printer, a commercial digital photo processing kiosk, a portable memory/media writer, a locally or remotely controlled laptop or personal computer, a personal digital assistant, a tablet computer, a device that stores and/or transmits electronic image data, such as a client or server of a wired or wireless network, such as, for example, an intranet, and extranet, a local area network, a wide area network, a storage area network, and/or the Internet (especially the World Wide Web). In general the data sink(s) 640 may be any known or later-developed sink that is capable of storing, transmitting, or outputting electronic image data. For example, the input/output interface 310 may be considered all or part of the data sinks(s) 530 since it may serve the function of storing, transmitting, or outputting electronic data from the system 300.

Each of the various links 615, 625, 635, and 645 may be any known or later-developed device or system for connecting the input device(s) 610, the output device(s) 620, the data source(s) 630, and/or the data sink(s) 640, respectively, to the input/output interface 410. In particular, the links 615, 625, 635, and 645 nay each be implemented as, for example, one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 4, the memory 430 may be functionally, physically, or conceptually divided into a number of different memory portions, including a transform data portion 430-1, a decompression data portion 430-2, a characterization data portion 430-3, a decoding data portion 330-4, an image (I) portion 330-5, a gamut-mapped image ($I_G$) portion 330-6, a residual image (ΔI) portion 330-7, a compressed residual image ($\Delta I_C$) portion 330-8, and/or a gamut-reduced watermarked image ($I_{G-WM}$) portion 330-9.

The transform data portion 430-1 may store data for image transforms (e.g., transform functions and/or algorithms). The decompression data portion 430-2 may store decompression data for decompression (e.g., JPEG, JPEG 2000, or predictive coding transforms and/or algorithms). The characterization data portion 430-3 may store data for converting between different color space characterizations (e.g., ICC profiles). The decoding data portion 330-4 may store data for decoding data within an image (e.g., functions and/or algorithms necessary to interpret a digital watermark).

The image (I) portion 330-5 may store an original image, for example, created by the image rebuilding circuit, routine, or application 470. The gamut-mapped image ($I_G$) portion 330-6 may store an image that has been gamut mapped. The residual image ($\Delta I$) portion 330-7 may store a residual image, for example, decompressed by the decompression circuit, routine, or application 360 or decoded by the decoding circuit, routine, or application 440. The compressed residual image ($\Delta I_C$) portion 330-8 may store a compressed residual image, for example, decoded by the decoding circuit, routine, or application 440. The gamut-reduced watermarked image ($I_{G-WM}$) portion 330-9 may store a gamut-reduced watermarked image, for example, input by a data source 630.

The memory 430 shown in FIG. 4 may be implemented using any appropriate combination of alterable, volatile, non-volatile, non-alterable, and/or fixed memory. The alterable memory, whether volatile or non-volatile, can be implemented using, for example, any one or more of static or dynamic RAM, a floppy disk and disk drive, a writeable or re-re-writeable optical disk and disk drive, a hard drive, and/or flash memory. Similarly, non-alterable or fixed memory can be implemented using, for example, any one or more of ROM, PROM, EPROM, EEPROM, an optical ROM disk, such as CD-ROM or DVD-ROM disk, and/or disk drive.

The decoding circuit, routine, or application 440 decodes data that is encoded within an image as, for example, a digital watermark. The decompression circuit, routine, or application 450 decompresses compressed data. The conversion circuit, routine, or application 460 converts image data with one color space characterization to another color space characterization. The image rebuilding circuit, routine, or application 470 combines gamut-reduced image data with residual image data to create original image data. The transform circuit, routine, or application 480 transforms image data.

In operation, the exemplary system 400 for decoding a residual image within a gamut-mapped image may operate in the following manner.

Under control of the controller 420, data representing a gamut-reduced watermarked image is input, for example, from a data source 530 across link 535 via the input/output interface and stored in the original image (I) portion 330-6. Alternatively, the gamut-reduced watermarked image data may be input, under control of the controller 320, directly into the decoding circuit, routine, or application 440. The decoding circuit, routine, or application 440 may access the gamut-reduced watermarked image data and/or the decoding data, for example, stored in the decoding data portion 430-4 and decode the compressed residual image data contained, for example, in the encoded watermark. Under control of the controller 420, the compressed residual image data may be stored in the compressed residual image data ($\Delta I_C'$) portion 430-8. The remaining gamut reduced image data may be stored in, for example, the gamut-reduced image (IG') data portion 430-6. Alternatively, under control of the controller 420, one or more of the compressed residual image data and gamut-reduced image data may be input directly to the decompression circuit, routine, or application 450 and/or conversion circuit, routine, or application 460, respectively.

The decompression circuit, routine, or application 450 may access the compressed residual image data and/or the decompression data, for example, stored in the decompression portion 430-2, and decompress the compressed residual image data to create residual image data. Under control of the controller 420, the residual image data may be stored in the residual image data ($\Delta I'$) portion 430-7. Alternatively, under control of the controller 420, the residual image data may be input directly to the image rebuilding circuit, routine, or application 470.

The conversion circuit, routine, or application 460 may access the gamut-reduced image data, for example, stored in the gamut-reduced image ($I_G'$) data portion 430-6 and/or the characterization data stored in the characterization data portion 430-3, and convert the gamut-reduced image data to a predetermined color space characterization. Under control of the controller 420, the converted gamut-reduced image data may be stored in the gamut-reduced image ($I_G'$) data portion 430-6. Alternatively, under control of the controller 420, the converted gamut-reduced image data may be input directly into the image rebuilding circuit, routine, or application 470.

The image rebuilding circuit, routine, or application 470 may access the residual image data, for example, stored in the residual image data ($\Delta I'$) portion 430-7 and/or the converted gamut-reduced image data may be stored in the gamut-reduced image ($I_G'$) data portion 430-6, and add the residual image data to the converted gamut-reduced image data to create the original image data. Under control of the controller 420, the original image data may be stored in the original image (I') data portion 430-5. Alternatively, under control of the controller 420, the original image data may be input directly in to the transform circuit, routine, or application 480. If an image transform is unnecessary because, for example, it was not performed on the original image when being gamut-reduced or it was part of the gamut mapping function or algorithm, the original image data may be output directly to a data sink 640 via the input/output interface 410.

The transform circuit, routine, or application 480 may access the original image data, for example, stored in the original image (I') data portion 430-5 and/or the transform data, for example, stored in the transform data portion 430-1, and transform the original image data to undo any transforms that might have been performed on the original image data prior to its being gamut reduced. Under control of the controller 420, the transformed original image data may be stored in the original image (I') data portion 430-5. Alternatively, under control of the controller 420, the transformed original image data may be output directly to a data sink 640 via the input/output interface 410.

It should be appreciated that any of the various components of either of the exemplary system 300 for encoding a residual image in a gamut-mapped image or the exemplary system 400 for decoding a residual image within a garnut-reduced image described herein may be combined or divided according to, for example, cost, resource, and/or functional considerations. For example, the exemplary encoding and decoding systems 300, 400 may be combined into a single encoding and decoding system. Furthermore, all or part of either or both of the exemplary systems 300, 400 may be implemented using at least a controller and memory, for example, on a general purpose computer. According to such an exemplary system, one or more of the various memory portions may be implemented within a memory and one or more of the various circuits, routines, or applications may be implemented within a controller.

As described above, it is possible to preserve the data necessary to reverse gamut-mapping within a hard copy of the gamut-mapped image. Thus, even if the only available copy of an image is a gamut-reduced image, the original image may be decoded from that gamut reduced image for reproduction on a larger gamut device.

As described above, the compressed, or uncompressed residual image ΔI may be encoded within the gamut-reduced image as a digital watermark according to, for example, the methods described in [Xerox Invention Disclosure A/22198]. However, any method in which the residual may be preserved within the output gamut-reduced image $I_G$ may be used. For example, a pointer (e.g., a barcode or url) may be encoded within the gamut-reduced image. Such a pointer may be a relatively small amount of data that points to a location, for example, on a network, where the residual image ΔI is stored. The pointer may be decoded, and then the residual image ΔI may be located on the network and used to restore the gamut-reduced image $I_G$.

As described above, the residual images may be compressed by predictive coding. Predictive coding may be an effective compression tool because large regions of a compressed image may have little or no loss (lossless compression), while the areas with loss (lossy compression) are typically coherent, i.e., the lost portion may be predicted and substantially restored. For example, because of the nature of L* compression, L* errors (data lost due to the compression) tend to be highly correlated to the L* value in the output image. Thus, for a given function, and any given output error, there is a limited set of input values that could have produced the error. For example, in a 4 bit space, with an L* compression that maps 15 to 10, using a non-linear mapping the mapping could look like Table 1.

TABLE 1

Example of nonlinear L* mapping for 4 bit input values.

| | |
|---|---|
| 0 | 0 |
| 1 | 1 |
| 2 | 2 |
| 3 | 3 |
| 4 | 4 |
| 5 | 4 |
| 6 | 5 |
| 7 | 6 |
| 8 | 7 |
| 9 | 8 |
| 10 | 9 |
| 11 | 9 |
| 12 | 9 |
| 13 | 10 |
| 14 | 10 |
| 15 | 10 |

In exemplary Table 1, roughly half of the output values uniquely determine the input values that generated them. Thus, there is no loss or error associated with those values. The remaining output values map to a small set of possible input values. Thus, one possible way of enhancing the compression rate without increasing the loss is to use the input L* value to predict the most likely value of the output L* value, and store only the difference between the predicted and actual output L* values. Generally only a few bits per pixel are required to obtain the difference between the predicted and output L* values.

TEST EXAMPLE

In a partial simulation, the residual image (i.e. the difference between an image that had been gamut mapped and the corresponding original), was obtained and compressed it at a bit rate of 0.03 bpp using the JPEG 2000 standard.

To test how well the residual image could be used to restore a gamut-mapped image, a series of images (see Table 2, below) were passed through the following testing process:

1. Gamut map original yielding gamut mapped image;
2. Subtract gamut mapped image from original image yielding residual image;
3. Compress residual image yielding compressed residual image;
4. Decompress compressed residual image yielding restored residual image;
5. Add restored residual image to gamut-mapped image yielding restored original image;
6. Subtract restored original image from original image yielding error image;
7. Combine L*, a*, b* of error image using Euclidean distance to obtain ΔE image;
8. Histogram ΔE image; and
9. Calculate mean and 95th percentile from histogram.

For the purpose of this error test, the original images were gamut-mapped using the Xpress® (wide-format thermal inkjet) gamut, which is relatively small, so as to maximize the amount of data encoded, thus stressing the proposed technique. Steps 1-6 and 8 used standard Sandpiper® tools; step 7 used a simple custom tool, while step 9 used Unix® tools "tr" and "awk." Table 2 shows the results for some sample pictorial images. The last two columns show the amount of information that would have been otherwise lost. The first two columns show the amount of data actually lost.

TABLE 2

ΔE results for test example

| | Method with recovery | | Amount of Gamut mapping loss | |
|---|---|---|---|---|
| Filename | Mean ΔE | 95$^{th}$ Percentile ΔE | Mean ΔE | 95$^{th}$ Percentile ΔE |
| boating | 0.475 | 1.5 | 10.6 | 13 |
| caps | 0.725 | 2.1 | 13.4 | 24 |
| macaws | 0.791 | 2.1 | 11.7 | 20 |
| window | 0.468 | 1.5 | 10.9 | 14 |

Both the quantitative and visual results indicated that even after fairly aggressive compression, the information lost in the gamut mapping process may be substantially retained via the above-described example. It should be noted that the above-described test example is disclosed herein to aid in the overall understanding of the conceptual discussion. Accordingly, the above-described test example is intended to be illustrative and in no way limits the results possible.

While various features of this invention have been described in conjunction with the conceptual discussion above, various alternatives, modifications, variations, and/or improvements of those features may be possible. Accordingly, the discussion and examples, as set forth above, are intended to be illustrative. Various changes may be made without departing from the spirit and scope of the invention.

What is claimed is:

1. A method of encoding gamut information into a marked image, comprising:
    transforming an image with a first gamut;
    mapping the transformed image to a second gamut to obtain a second-gamut image;
    determining a first residual image between the image with a first gamut and the transformed image;
    determining a second residual image between the transformed image and the second-gamut image; and separately encoding the first and second residual images within the second-gamut image, wherein the encoded first and second residual images may be decoded from a marked copy of the second-gamut image.

2. The method of claim 1, wherein determining the second residual image between the transformed image and the second-gamut image comprises determining a difference between the transformed image and the second-gamut image.

3. The method of claim 1, further comprising compressing the second residual image, wherein encoding the second residual image within the second-gamut image comprises encoding the compressed second residual image within the second-gamut image.

4. The method of claim 1, further comprising converting the second-gamut image to an output device color space characterization.

5. The method of claim 1, wherein encoding the second residual image within the second-gamut image comprises encoding the second residual image within the second-gamut image as a digital watermark.

6. The method of claim 1, wherein encoding the second residual image within the second-gamut image comprises encoding a pointer within the second-gamut image that points to the second residual image stored electronically.

7. A storage medium storing a set of program instructions executable on a data processing device and usable for performing the method recited in claim 1.

8. A method of decoding gamut information from a captured marked image, comprising:

decoding, from the captured marked image, a first residual image between an image with a first gamut and a transformed image;

decoding, from the captured marked image, a second residual image between the transformed image and a second-gamut image; and adding the decoded first and second residual images to the captured marked image, wherein the first gamut is larger than a gamut of the second-gamut image.

9. The method of claim 8, further comprising decompressing the second residual image.

10. The method of claim 8, further comprising converting the captured marked image to a predetermined color space characterization.

11. The method of claim 8, further comprising reversing an image transform.

12. The method of claim 11, wherein reversing an image transform comprises reversing the image transform after adding the decoded second residual image to the captured image.

13. The method of claim 8, wherein decoding the second residual image from the captured marked image comprises decoding a digital watermark within the captured marked image.

14. The method of claim 8, wherein:

decoding the second residual image from the captured marked image comprises decoding a pointer within the captured marked image that points to the second residual image stored electronically; and the method further comprises locating the residual image electronically.

15. A storage medium storing a set of program instructions executable on a data processing device and usable for performing the method recited in claim 8.

16. A system for encoding gamut information into a marked image, comprising:

an image data source that provides an image with a first gamut;

a controller that:

transforms the image with a first gamut;

maps the transformed image to a second gamut to obtain a second-gamut image;

determines a first residual image between the image with a first gamut and the transformed image;

determines a second residual image between the transformed image and the second-gamut image; and separately encodes the first and second residual images within the second-gamut image; and a data storage device that at least temporarily stores the second-gamut image, wherein the encoded first and second residual images may be decoded from a marked copy of the second-gamut image.

17. A system that decodes gamut information from a captured marked image, comprising:

an image data source that provides a captured marked image; and a controller that:

decodes, from the captured marked image, a first residual image between an image with a first gamut and a transformed image;

decodes, from the captured marked image, a second residual image between the transformed image and a second-gamut image; and adds the decoded first and second residual images to the captured image, wherein the first gamut is larger than a gamut of the second-gamut image.

* * * * *